(12) United States Patent
Cheng

(10) Patent No.: US 10,176,548 B2
(45) Date of Patent: Jan. 8, 2019

(54) GRAPHICS CONTEXT SCHEDULING BASED ON FLIP QUEUE MANAGEMENT

(71) Applicant: ATI TECHNOLOGIES ULC, Markham (CA)

(72) Inventor: Gongxian Jeffrey Cheng, Toronto (CA)

(73) Assignee: ATI TECHNOLOGIES ULC, Markham (CA)

(*) Notice: Subject to any disclaimer, the term of this patent is extended or adjusted under 35 U.S.C. 154(b) by 121 days.

(21) Appl. No.: 14/974,585

(22) Filed: Dec. 18, 2015

(65) Prior Publication Data

US 2017/0178273 A1    Jun. 22, 2017

(51) Int. Cl.
| | |
|---|---|
| *G06T 1/20* | (2006.01) |
| *G06T 1/60* | (2006.01) |
| *G09G 5/36* | (2006.01) |
| *G09G 5/393* | (2006.01) |
| *G09G 5/395* | (2006.01) |

(52) U.S. Cl.
CPC ............... *G06T 1/20* (2013.01); *G06T 1/60* (2013.01); *G09G 5/363* (2013.01); *G09G 5/393* (2013.01); *G09G 5/395* (2013.01); *G09G 2360/18* (2013.01)

(58) Field of Classification Search
None
See application file for complete search history.

(56) References Cited

U.S. PATENT DOCUMENTS

| | | | | |
|---|---|---|---|---|
| 5,969,728 A | * | 10/1999 | Dye | G09G 5/399 345/522 |
| 6,487,212 B1 | * | 11/2002 | Erimli | G06F 5/06 370/230 |
| 6,674,841 B1 | * | 1/2004 | Johns | G06F 9/461 379/265.03 |
| 6,747,654 B1 | * | 6/2004 | Laksono | G06T 1/20 345/502 |
| 7,176,848 B1 | * | 2/2007 | Dai | G06F 3/1438 345/2.2 |
| 7,796,135 B1 | * | 9/2010 | Diard | G06T 15/005 345/502 |
| 2004/0008204 A1 | * | 1/2004 | Deering | G09G 5/363 345/539 |
| 2004/0160446 A1 | * | 8/2004 | Gosalia | G06F 9/4843 345/503 |
| 2004/0187122 A1 | * | 9/2004 | Gosalia | G06F 9/4843 718/100 |

(Continued)

OTHER PUBLICATIONS

International Search Report and Written Opinion correlating to PCT/CA2016/051113 dated Nov. 30, 2016, 6 pages.

*Primary Examiner* — Yu Chen

(57) ABSTRACT

A processor includes a scheduler that governs which of a plurality of pending graphics contexts is selected for execution at a graphics pipeline of the processor. The processor also includes a plurality of flip queues storing data ready to be rendered at a display device. The executing graphics context can issue a flip request to change data at stored at one of the flip queues. In response to determining that the flip request targets a flip queue that is being used for rendering at the display device, the scheduler executes a context switch to schedule a different graphics context for execution at the graphics pipeline.

20 Claims, 5 Drawing Sheets

(56) References Cited

U.S. PATENT DOCUMENTS

| | | | | |
|---|---|---|---|---|
| 2006/0267990 A1* | 11/2006 | Rogers | G06T 1/20 | 345/502 |
| 2007/0091102 A1* | 4/2007 | Brothers | G06F 9/3879 | 345/506 |
| 2012/0147021 A1* | 6/2012 | Cheng | G06F 9/545 | 345/522 |
| 2013/0152108 A1* | 6/2013 | Jiang | G09G 5/363 | 719/321 |
| 2013/0159664 A1* | 6/2013 | Blinzer | G06F 9/3004 | 711/207 |
| 2013/0162911 A1* | 6/2013 | Glen | H04N 21/234327 | 348/586 |
| 2013/0229421 A1* | 9/2013 | Cheng | G06T 1/20 | 345/522 |

* cited by examiner

US 10,176,548 B2

GRAPHICS CONTEXT SCHEDULING BASED ON FLIP QUEUE MANAGEMENT

BACKGROUND

Field of the Disclosure

The present disclosure relates generally to processors and in particular relates to graphics context scheduling at a processor.

Description of the Related Art

To enhance processing efficiency, a processor sometimes employs a dedicated graphics pipeline to generate data for display at a display device. By employing a dedicated graphics pipeline, the processor removes the tasks of display data generation and management from its central processing units, allowing those units to execute operations related to system management and execution of user initiated applications. Based on these operations, the processor generates different graphics contexts, wherein each graphics context represents the instructions and state data to be used by the graphics pipeline in order to display one or more objects associated with the graphics context.

During execution at the graphics pipeline, a graphics context may generate a request, referred to as a flip request, to change a frame buffer being displayed. In some situations, execution of a command to change the contents of the buffer must be delayed until the display hardware is ready to execute the request. For example, a frame buffer targeted by the flip request may be in the process of being used when the command to change the contents of the frame buffer is made so that immediate execution of the command could result in tearing or other display errors. To prevent these errors, execution of operations at the graphics pipeline is stalled until the frame buffer is available to execute the command, but such delays can negatively impact processing efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for scheduling execution of graphics contexts at a processor based on flip queue management. The processor includes a scheduler that governs which of a plurality of pending graphics contexts is selected for execution at a graphics pipeline of the processor. The processor also includes a set of frame buffers storing data to be rendered at a display device, and a plurality of flip queues storing flip requests to change data at the set of frame buffers. In response to determining that a command issued by an executing graphics context targets a frame buffer that is being used for rendering at the display device because of a previous flip request, the scheduler executes a context switch to schedule a different graphics context for execution at the graphics pipeline. The scheduler thereby ensures that operations at the graphics pipeline are not stalled as a result of the flip request, improving processing efficiency.

Figure 1:
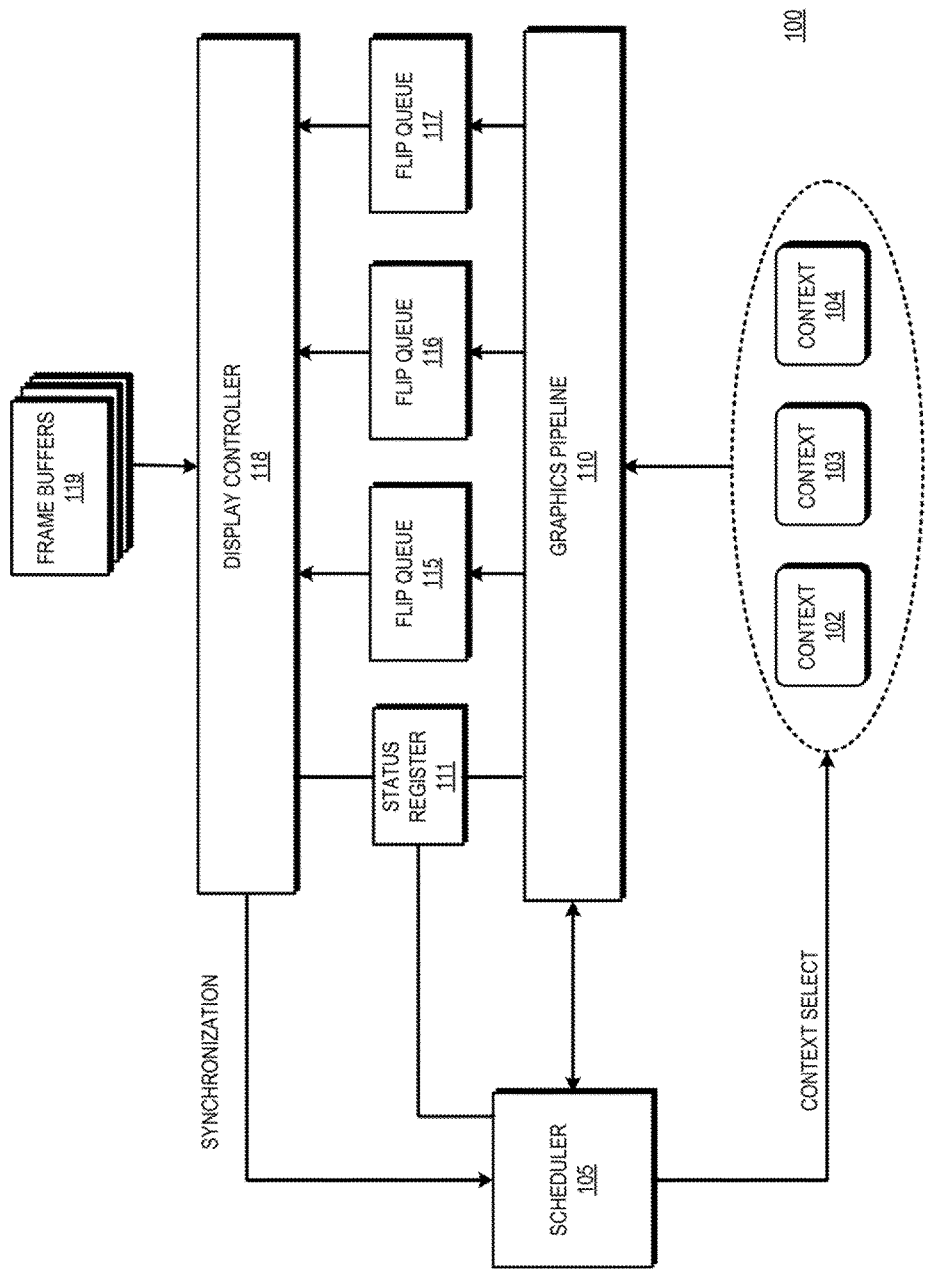
FIG. 1 is a block diagram of a processor that schedules graphics context execution at a graphics pipeline based on flip queue management in accordance with some embodiments.

FIG. 1 illustrates a processor 100 that can schedule execution of a plurality of pending graphics contexts based on availability of one or more frame buffers in accordance some embodiments. The processor 100 is a device generally configured to execute sets of instructions organized in the form of one or more computer programs in order to carry out operations on behalf of electronic device. Accordingly, the processor 100 can be included in any other variety of electronic devices, such as a desktop computer, laptop, server, game console, tablet, smartphone, and the like. To facilitate interaction with the user, the processor 100 can be connected through a wired or wireless protocol to a display device (not shown in FIG. 1) such as a display screen.

To support display of information at the display device, the processor 100 includes a graphics pipeline 110, a scheduler 105, flip queues 115, 116, 117, and a display controller 118. As described further herein, these features of the processor 100 are generally configured to support the management and execution of graphics contexts (e.g., graphics contexts 102, 103, and 104) to display information at the display device. As used herein a graphics context refers to a set of instructions and associated state information corresponding to an object to be displayed. A graphics context can therefore be associated with any object that can be displayed by a computer device, such as a window, icon, desktop background, graphical object (e.g. a sprite or other object being displayed in a computer game), and the like. Thus, for example, a graphics context corresponding to a computer window includes the instructions to generate the data to display the window, based on state information included in the graphics context, such as window size, title, menu items, buttons, and the like.

For purposes of description, it is assumed that the graphics contexts are generated by one or more computer programs executed by a CPU (not shown) of the processor 100. For example, an application program executing by the CPU may generate graphics contexts corresponding to one or more windows for display of information by the application program.

The scheduler 105 is a hardware module generally configured to schedule graphics contexts for execution at the graphics pipeline 110. To illustrate, in some embodiments the CPU can generate multiple graphics contexts, illustrated as graphics contexts 102-4, for concurrent display at the display device. These multiple graphics contexts are referred to as "pending" graphics contexts to reflect that they are ready for execution at the graphics pipeline 110. The pending graphics contexts can be changed over time by the CPU or other module of the processor 100 to reflect changes in the corresponding displayed object. For example, a graphics context corresponding to a window object can be updated by the CPU in response to a user providing input information indicating the window data is to be updated on the display. The CPU updates the graphics context to reflect the data update in the window, resulting in the graphics context including new or different instructions for execution. In some embodiments, a graphics context remains pending until the CPU identifies an action indicating the corresponding object is no longer to be displayed, such as an action indicating a window has been closed by the user.

Each of the pending graphics contexts is, at a given point in time, in one of at least two different states, referred to as a runnable state and a non-runnable state, reflecting whether the graphics context is available to be scheduled for execution at the graphics pipeline 110. The state of a graphics context can be changed by the graphics pipeline 110, by the scheduler 105, by the CPU, or by another module of the processor 100, from runnable to non-runnable and vice-versa, in order to efficiently manage scheduling of graphics contexts at the graphics pipeline 110. For example, as described further herein, the scheduler 105 can change the state of an executing graphics context from the runnable state to the non-runnable state in response to determining that a particular resource required to execute the graphics context, such as a flip queue, is temporarily unavailable. Once the resource is available, the scheduler 105 can change the status of the graphics context from the non-runnable state to the runnable state so that execution of the graphics context can be resumed.

The scheduler 105 schedules those pending graphics contexts that are in the runnable state for execution based upon a combination of a specified scheduling scheme and sensed conditions at the processor 100. To illustrate, in some embodiments the scheduler 105 includes one or more modules to sense conditions at the graphics pipeline 110 and conditions at other modules of the processor 100. Based on these sensed conditions, the scheduler 105 selects one of the pending graphics contexts to be executed at the graphics pipeline 110. If the sensed conditions indicate that more than one of the pending graphics contexts can be selected for execution, the scheduler 105 can select among the contexts based on a specified selection scheme, such as a round robin scheme. For example, the scheduler 105 can assign each of the runnable graphics contexts a portion of time of a specified duration for execution, and execute each runnable graphics context during its assigned portion of time. By selecting among the pending contexts based on the sensed conditions, the scheduler 105 can improve processing efficiency at the processor 100.

The graphics pipeline 110 is set of stages generally configured to execute the instructions of scheduled graphics contexts. Accordingly, in some embodiments the graphics pipeline 110 includes a fetch stage, a dispatch stage, one or more execution stages, and a retirement stage. In response to a request from the scheduler 105 to execute a different graphics context (referred to as a "context switch") the graphics pipeline 110 can save state information for the graphics context currently being executed, load any saved state information for the requested graphics context, and then initiate fetching, dispatching, execution, and retirement of instructions for the requested graphics context until the scheduler 105 issues another context switch request.

In the course of executing instructions, the graphics pipeline 110 generates requests to change the data being displayed at the display device. To illustrate, the processor 100 includes flip queues 115, 116, and 117, each to requests to change, or flip, data for display at the display device. In some embodiments, each of the graphics contexts 102-104 is assigned to a different one of the flip queues 115-117. Thus, for example, graphics context 102 can be assigned to flip queue 115, graphics context 103 can be assigned to flip queue 116, and graphics context 104 can be assigned to flip queue 117. In some embodiments, a graphics context can be assigned to multiple flip queues, but each flip queue is associated with only one graphics context. To change data for display, a graphics context issues a flip request to that queue.

The display controller 118 is a hardware module generally configured to read flip requests from the flip queues 115-117 and based on the flip requests to alter data for rendering at the display device. To illustrate, the display controller 118 interfaces with frame buffers 119. Each of the frame buffers 119 stores data to be rendered at the display device. The data stored at an individual one of the frame buffers 119 is referred to as a "frame". To improve display throughput, the display controller 118 proceeds through the frame buffers 119 to display the corresponding frames in sequence, changing frame buffers during a synchronization interval, such as a vertical synchronization interval, of the display device. This allows frames that are not in the process of being rendered to be changed by commands as described further below, improving throughput at the display controller. To illustrate, in some embodiments, the frame buffers 119 include three different frame buffers, designated Buffer A, Buffer B, and Buffer C, respectively. The display controller 118 first renders the frame in Buffer A, during which time the frames in Buffer B and Buffer C, respectively, can be altered without causing visible display errors. In response to a flip request from the graphics context, and upon completing rendering of Buffer A, as indicated by a vertical synchronization period for the display device, the display controller 118 proceeds to render the frame stored at Buffer B, and the frames at Buffer A and Buffer C can be altered. After rendering the frame at Buffer B, the display controller 118 proceeds to render the frame at Buffer C in response to another flip request from the graphics context. In response to yet another flip request and upon completing the frame at Buffer C, the display controller 118 returns to Buffer A. The display controller 118 thus proceeds through the frame buffers based on flip requests issued by executing graphics contexts.

As explained above, each flip request stored at the flip queues 115-117 represents a request to switch to one of the frame buffers 119. Accordingly, each flip request includes an indicator of the frame buffer targeted by the flip request. In some embodiments, the flip queues 115-117 may collectively include multiple flip requests targeting the display device. The display controller 118 can include a compositor to reconcile the requested changes and compose a composite frame from the multiple frame buffers for the targeted display device.

As indicated above, the display controller 118 renders frames from the frame buffers 119. A change to a frame buffer while that frame buffer is being rendered would cause visible errors in the display, such as tearing, ghosting, or other visual errors. Accordingly, the display controller 118 prevents changes to a frame buffer that is in the process of being rendered at the display device. For purposes of discussion, a frame buffer that is in the process of providing its data for rendering is referred to as unavailable. A frame buffer that is not in the process of providing its data for rendering at the display device is referred to as available, and its stored data is referred to as awaiting use for display.

Modification of frame data at a frame buffer that is in the process of being rendered can result in tearing or other display errors. To prevent such errors the display controller 118 prevents modification of a frame buffer whose data is in the course of being provided for rendering at the display device. For example, in some embodiments, in response to initiating a flip request from a graphics context, a specified value is written to a status register 111 associated with a frame buffer. The display controller clears this value from the status register 111 upon completion of retrieving data from the frame buffer for rendering. Prior to updating data in a frame buffer, the graphics pipeline 110 checks the status register for the frame buffer. If the status register stores the specified value, the graphics pipeline 110 stalls and refrains from updating the data in the frame buffer.

To reduce the impact of such stalls on performance of the processor 100, the scheduler 105 can schedule execution of the graphics contexts 102-104 based on the availability of frame buffers targeted by the flip requests. To illustrate, the scheduler 105 monitors the graphics pipeline 110 for commands to request to modify data at a frame buffer and concurrently monitors which of the frame buffers 119 is available. In response to identifying that a command to request to modify data targets an unavailable frame buffer, and will therefore cause the corresponding graphics context to be stalled, the scheduler 105 selects a different graphics context for execution at the graphics pipeline 110. Once the frame buffer has completed rendering, the scheduler 105 can resume execution of the previously scheduled graphics context, either immediately or at a convenient future point.

By scheduling execution of graphics contexts based on the availability of the frame buffers 119, the scheduler 105 enhances processor performance by ensuring that a stall for one graphics context does not cause a stall in all pending graphics contexts. To illustrate, in a conventional processor, a command to request to modify data at a frame buffer that is in the process of being rendered causes a stall in the execution of the graphics context that issued the command. The processor waits until rendering of the frame buffer has been completed, then resumes execution of the stalled graphics context. All other pending graphics contexts are also stalled while the processor waits for the frame buffer to become available. Using the techniques described herein, in response to a graphics context issuing a command to request to modify a frame buffer that is in the process of being rendered, the scheduler 105 schedules a different graphics context for execution. This allows the graphics pipeline 110 to do useful work while one or more graphics contexts await availability of a frame buffer.

Figure 2:
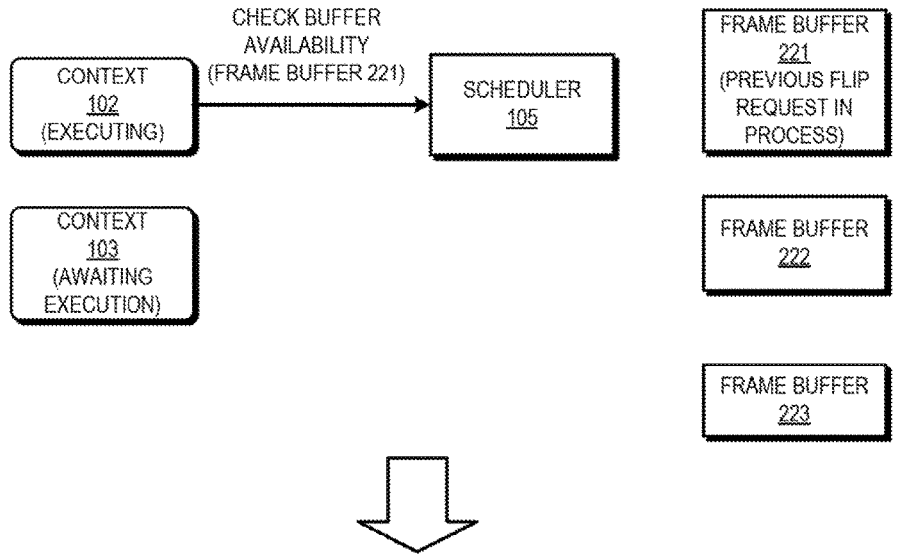
FIG. 2 is a block diagram illustrating scheduling of a graphics context at the processor of FIG. 1 based on the availability of a frame buffer in accordance with some embodiments.
Figure 2:
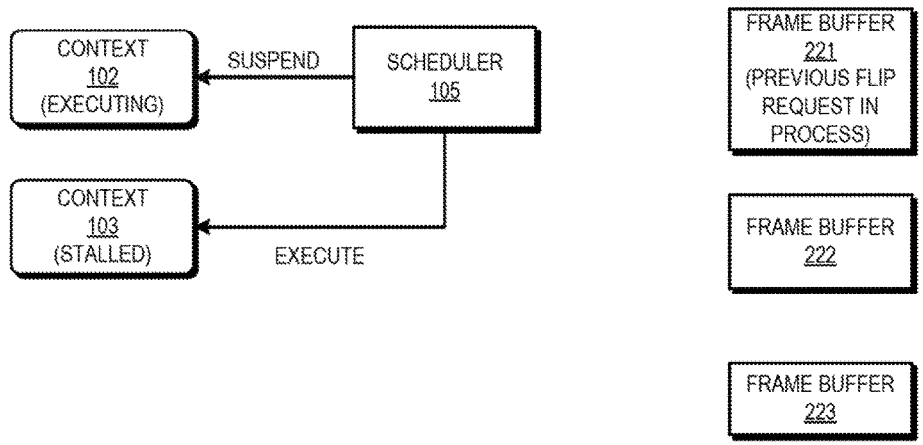

FIG. 2 illustrates an example of the scheduler 105 of FIG. 1 scheduling graphics contexts at the graphics pipeline 110 based on frame buffer availability in accordance with some embodiments. In the illustrated example, at time 201 the graphics context 102 is executing at the graphics pipeline 110, while the graphics context 103 is pending and awaiting execution. In addition, in the illustrated example the display controller 118 includes three frame buffers, designated frame buffer 221, frame buffer 222, and frame buffer 223. The frame buffer 221 stores a frame designated that is in the course of being rendered, and frame buffer 221 is therefore unavailable. Frame buffers 222 and 223 are both available.

At time 201, the graphics context 102 identifies that its next command is a command to update data in frame buffer 221. Before the graphics context 102 proceeds to update the data, it first checks if the frame buffer 221 is available. In response, the scheduler 105 identifies that the targeted frame buffer 221 is unavailable because it is being rendered by the display controller. Accordingly, at time 202 the scheduler 105 executes a context switch by suspending execution of the graphics context 102 and scheduling execution of the graphics context 103. Thus, while the graphics context 102 is awaiting availability of the frame buffer 221, the graphics pipeline 110 executes the graphics context 103, enhancing processing efficiency at the processor 100. In some embodiments, the scheduler 105 may employ a timeout period when the waiting graphics context is allowed to stay stalled and not suspended, in case the frame buffer becomes available shortly afterwards so to avoid context switching overhead.

Figure 3:
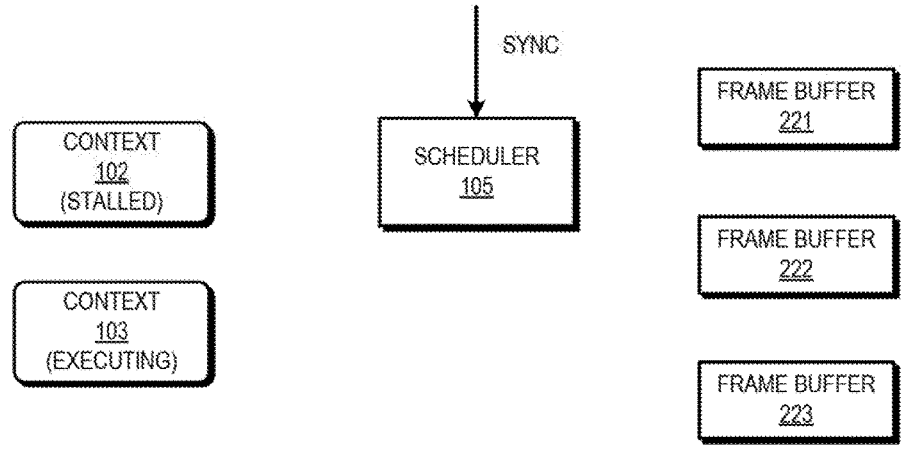
FIG. 3 is a block diagram illustrating resumption of execution of a graphics context at the processor of FIG. 1 based on a previously unavailable frame buffer becoming available in accordance with some embodiments.
Figure 3:
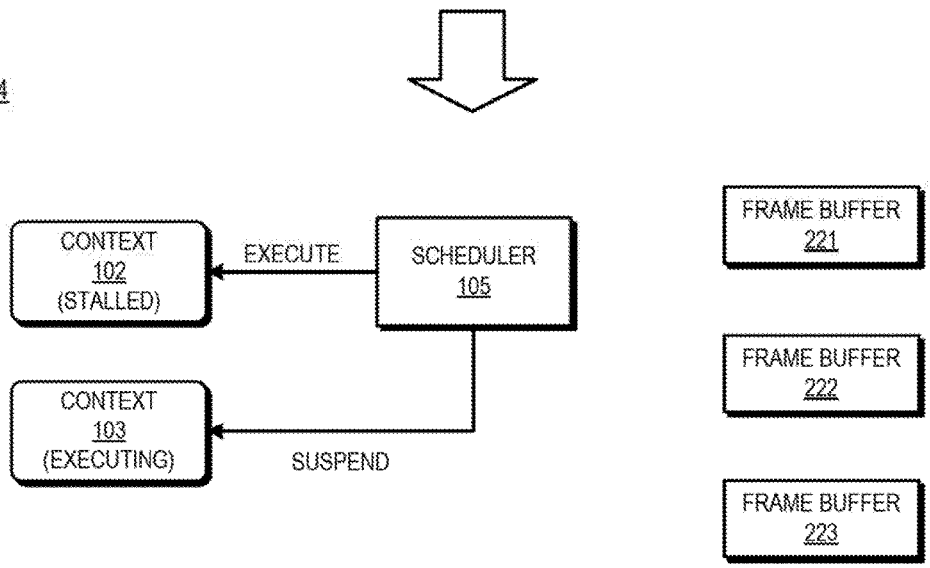

FIG. 3 illustrates an example of the scheduler 105 resuming execution of a previously suspended graphics context at the graphics pipeline 110 in accordance with some embodiments. The example of FIG. 3 is a continuation of the example of FIG. 2, wherein graphics context 103 has been scheduled for execution at the graphics pipeline 110 in response to execution of the graphics context 102 being suspended because a frame buffer 221 was unavailable to be updated by the graphics context 102. At time 303, occurring after time 202 of FIG. 2, the scheduler 105 receives a synchronization signal from the display controller 118. In response, the graphics pipeline 110 checks the status register 111 and, based on the value stored there, determines that rendering of the frame data at the frame buffer 221 is complete. Accordingly, at time 304 the scheduler 105 performs a context switch to suspend execution of the graphics context 103 and resume execution of the graphics context 102. In some embodiments, the scheduler 105 does not immediately check the status register in response to the synchronization signal, but waits for a more convenient or efficient time, such as when the graphics context 103 is stalled on a frame buffer that is unavailable or when the graphics context 103 otherwise reaches a point where it is awaiting a response from another module of the processor 100.

Figure 4:
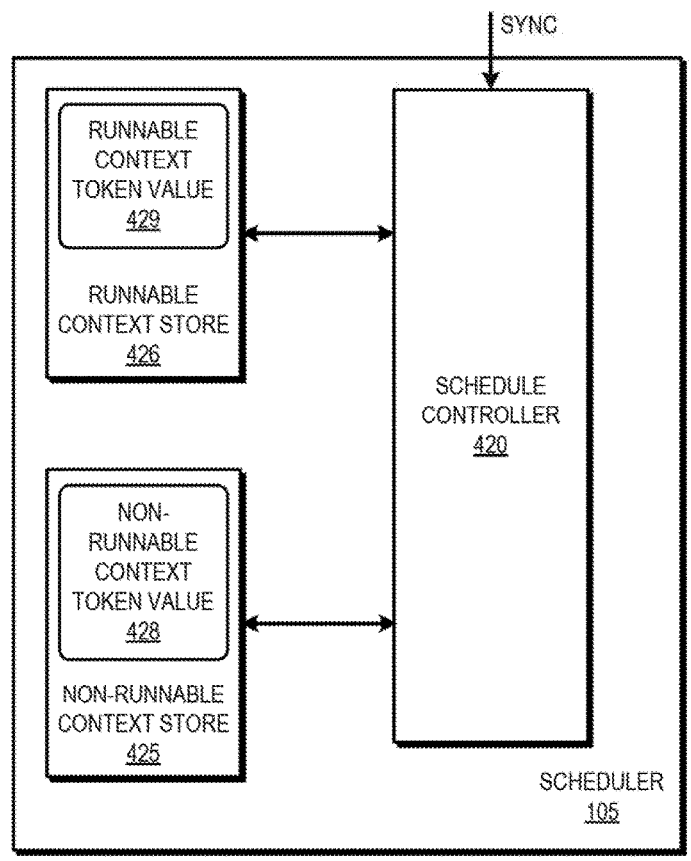
FIG. 4 is a block diagram of a scheduler of the processor of FIG. 1 that schedules graphics contexts for execution based on flip queue management in accordance with some embodiments.

FIG. 4 illustrates a block diagram of an example of the scheduler 105 in accordance with some embodiments. In the depicted example, the scheduler 105 includes a schedule controller 420, a non-runnable context token store 425, and a runnable context token store 426. The non-runnable context token store 425 is a storage structure, such as a set of registers, which stores identifier values (e.g., token 428) for contexts pending for execution which are in a non-runnable state. In some embodiments, when the CPU generates a context, it also generates a token value for the context different from token values for the other pending graphics contexts. The CPU provides the token value to the scheduler 105 which employs the token value to identify the graphics context for context switches and other management operations.

The runnable context store 426 is a storage structure, such as a set of registers, which stores the token values (e.g. token 429) for the contexts that are in a runnable state. The values stored at the non-runnable context store 425 and the runnable context store 426 can be updated by the scheduler 105 or another module to change the runnable state of a graphics context. For example, to indicate that a graphics context is in a runnable state the scheduler 105 can write the token value for the graphics context to the runnable context store 426. In response to determining that a graphics context is not runnable (because, for example, the context has issued a flip request for a frame buffer that is in the process of being rendered), the scheduler 105 clears the token value for the graphics context from the runnable context store 426 and writes the token value to the non-runnable context store 425.

This process can be reversed to change the state of the graphics context from the non-runnable state to the runnable state.

The schedule controller 420 is a module configured to identify conditions for a context switch and, in response to identifying such conditions, issuing requests for context switches to the graphics pipeline 110. In operation, in response to receiving an indication from the display controller 118 that a flip request has been issued for a frame buffer that is in the process of being rendered, the schedule controller 420 clears the context token value for the graphics context being executed from the runnable context store 426, to indicate that the graphics context is stalled and therefore not runnable. The schedule controller then selects another token value from the runnable context token value store 426. In some embodiments, the token value is selected based on a priority value associated with the token value, based on one or more detected conditions at the processor 100, based on a defined selection order, such as a FIFO order or round-robin order, and the like. The schedule controller 420 provides the selected token value, or a value associated therewith such as an instruction pointer value indicating the next instruction of the graphics context to be executed, to the graphics pipeline 110. The graphics pipeline 110 then initiates or resumes execution of the graphics context corresponding to the selected token value.

The schedule controller 420 can also receive an indication from the display controller 118 that rendering of a frame at a frame buffer has been completed. In response to the indication, the schedule controller 420 can identify token values for any graphics contexts that have been awaiting availability of the frame buffer. The schedule controller 420 then transfers those token values to the runnable context store 426, so that the graphics contexts corresponding to the threads are available for selection during the next context switch event. In some embodiments, the indication from the display controller 118 can itself trigger a context switch by the schedule controller 420.

Figure 5:
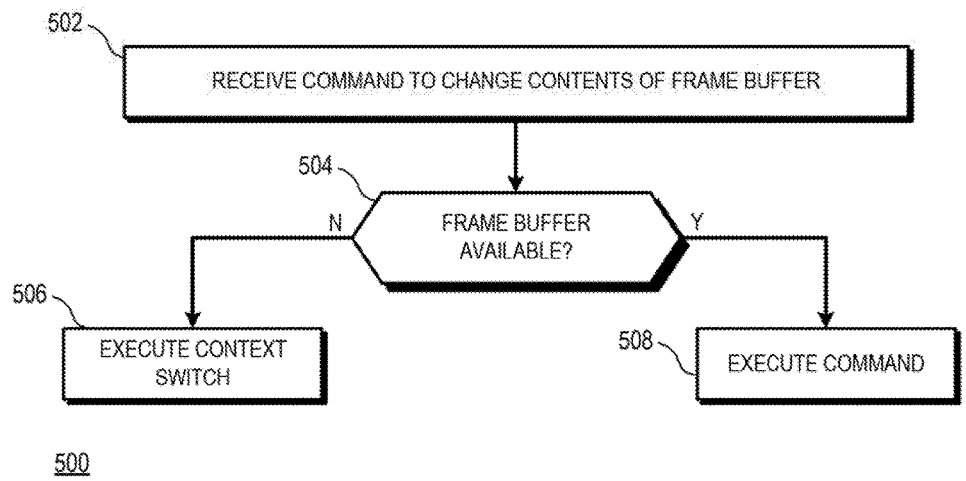
FIG. 5 is a flow diagram of a method of scheduling graphics contexts for execution at a processor based on availability of frame buffers in accordance with some embodiments.

FIG. 5 illustrates a block diagram of a method 500 of scheduling graphics contexts at a graphics pipeline based on flip queue availability in accordance with some embodiments. For purposes of description, the method 500 is described with respect to an example implementation at the processor 100 of FIG. 1. At block 502, a graphics context executing at the graphics pipeline 110 requests to change at least a portion of data stored in a frame buffer. At block 504, the scheduler 105 and the graphics pipeline 110 determine whether the frame buffer targeted by the flip request is available. That is, the scheduler 105 determines whether the targeted frame buffer is in the process of being used for rendering by the display controller 118 and is therefore not available.

If the frame buffer targeted by the flip request is available, the method flow proceeds to block 508 and the graphics pipeline 110 executes the data updating request at the targeted frame buffer. Returning to block 504, if the frame buffer targeted by the data updating request is not available, the method flow moves to block 506 and the scheduler 105 executes a context switch. In particular, the scheduler 105 places the currently executing graphics context in the non-runnable state and selects a different graphics context from the set of graphics contexts that are currently in the runnable state. The scheduler 105 then issues a context switch request to the graphics pipeline 110. In response, the graphics pipeline 110 saves state information for the presently executing graphics context so that it can later be resumed, loads any previously-saved state information for the selected graphics context, and proceeds to execute instructions of the selected graphics context.

Figure 6:
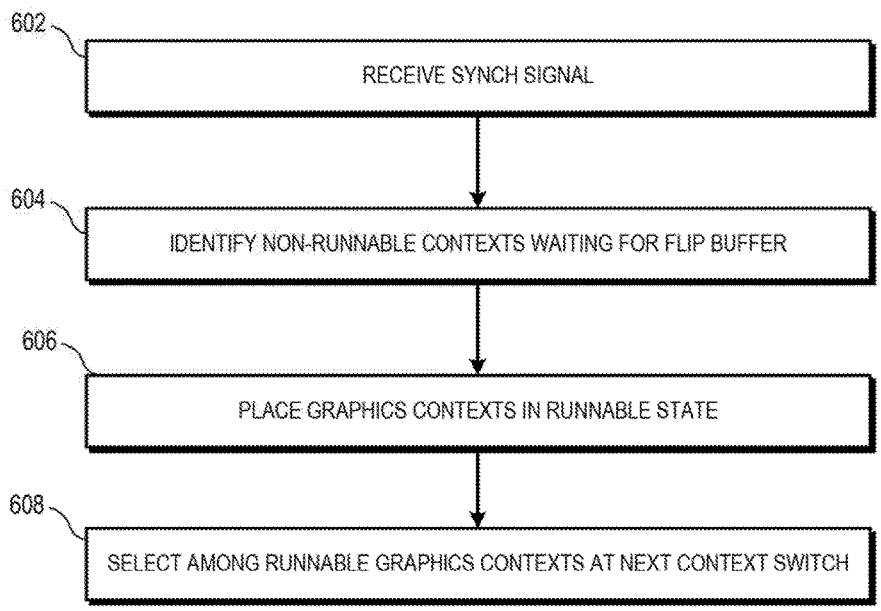
FIG. 6 is a flow diagram of a method of placing graphics contexts in a runnable state based on a frame buffer becoming available in accordance with some embodiments.

FIG. 6 illustrates a flow diagram of a method 600 of resuming execution of graphics contexts previously suspended based on flip requests in accordance with some embodiments. For purposes of description, the method 600 is described with respect to an example implementation at the processor 100 of FIG. 1. At block 602, the scheduler 105 receives an indication of a synchronization signal at a display device, such as a vertical synchronization signal or horizontal synchronization signal. The synchronization signal indicates an opportune time to check the status register for the graphics contexts to determine if a frame buffer has become available. At block 604, the scheduler 105 identifies any graphics contexts in the non-runnable state that were placed in that state because of flip requests targeting the newly available frame buffer. That is, the scheduler 105 identifies those graphics contexts that were waiting for the flip queue to become available. At block 606, the scheduler 105 places the identified graphics contexts in the runnable state. At block 608, in response to the next context switch the scheduler 105 selects from among the graphics contexts that are in the runnable state, including those that were placed in the runnable state at block 606, allowing those graphics contexts to complete their flip requests and resume execution.

In some embodiments, the apparatus and techniques described above are implemented in a system comprising one or more integrated circuit (IC) devices (also referred to as integrated circuit packages or microchips), such as the processor described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, from a first graphics context in execution, a request to modify contents of a first frame buffer;
determining whether the first frame buffer is in use;
when the first frame buffer is determined to be in use, suspending execution of the first graphics context;
while the execution of the first graphics context is suspended, executing a second graphics context at a processor until the second graphics context is stalled when attempting to execute a change to contents of a second frame buffer that is in use; and
when the second graphics context stalls, resuming execution of the first graphics context at the processor based on determining that the first frame buffer is no longer in use.

2. The method of claim 1, further comprising:
completing a first flip request; and
storing a first value at a first storage location.

3. The method of claim 2, further comprising:
resuming execution of the first graphics context in response to identifying that the first value is stored at the first storage location.

4. The method of claim 1, further comprising:
receiving a synchronization signal for a display device from the display controller; and
determining that rendering of the first frame buffer is complete by identifying that a first value is stored at a first storage location in response to receiving the synchronization signal.

5. The method of claim 4, wherein the synchronization signal comprises a vertical synchronization signal.

6. The method of claim 4, wherein the synchronization signal comprises a horizontal synchronization signal.

7. The method of claim 1, further comprising:
selecting the second graphics context from a plurality of pending graphics contexts available to execute at the processor, wherein:
the second graphics context includes a set of instructions and state information for an object to be displayed by a display device; and
the second graphics context remains pending until the processor identifies the second graphics context is no longer to be displayed.

8. The method of claim 7, further comprising:
in response to receiving a flip request at the processor from the second context, maintaining execution of the second context in response to the second context being associated with modification of data at the second frame buffer while the second frame buffer awaits use for display.

9. The method of claim 1, further comprising:
composing a composite frame from the first frame buffer and the second frame buffer.

10. At a processor comprising a plurality of frame buffers available for selection by a display controller for display, a method comprising:
scheduling execution of a first graphics context and a second graphics context of a plurality of graphics contexts to render the plurality of frame buffers by the display controller;
determining whether a first frame buffer of the plurality of frame buffers is in use based on receiving a request to modify contents of the first frame buffer;
when the first frame buffer is determined to be in use, suspending the execution of the first graphics context;
while the execution of the first graphics context is suspended, executing the second graphics context until the second graphic context is stalled when attempting to execute a change to content of a second frame buffer of the plurality of frame buffers; and
when the second graphics context stalls, resuming the execution of the first graphics context based on determining that the first frame buffer is no longer in use.

11. The method of claim 10, wherein determining whether the first frame buffer is in use is based on a stored value indicating that the first frame buffer is not selected for display by the display controller.

12. The method of claim 11, further comprising:
modifying a stored value indicating that the second frame buffer is in use.

13. A processor, comprising:
a plurality of frame buffers including a first frame buffer and a second frame buffer;
a graphics pipeline;
a display controller to render data at the first frame buffer in response to a first flip request;
a scheduler to, in response a first graphics context executing at the graphics pipeline indicating a request to change contents of the first frame buffer:
determine whether the first frame buffer is in use;
when the first frame buffer is determined to be in use, suspend execution of the first graphics context;
while the execution of a first graphics context is suspended, execute a second graphics context until the second graphics context is stalled when attempting to execute a change to contents of the second frame buffer that is in use; and
when the second graphics context stalls, schedule the resumption of the execution of the first graphics context at the graphics pipeline based on determining that the first frame buffer is no longer in use.

14. The processor of claim 13, wherein the scheduler is to:
in response to completing the first flip request, store a value at a first storage location of a plurality of storage locations of the processor.

15. The processor of claim 14, wherein scheduling the resumption of execution of the first graphics context at the graphics pipeline includes identifying that the first value is stored at the first storage location.

16. The processor of claim 15, wherein the scheduler is further to:
determine that the first value is stored at the first storage location in response to receiving a synchronization signal from the display controller.

17. The processor of claim 16, wherein the synchronization signal comprises a vertical synchronization signal.

18. The processor of claim 16, wherein the synchronization signal comprises a horizontal synchronization signal.

19. The processor of claim 14, wherein the scheduler is further to:
select the second graphics context from a plurality of pending graphics contexts based on the second context being associated with change of the contents of the second frame buffer of a plurality of flip queues awaiting use for display.

20. The processor of claim 19, wherein the scheduler is further to:
in response to a second flip request from the second context, maintain execution of the second context in response to the second context being associated with change of the contents of the second frame buffer while the second frame buffer awaits use for display.

* * * * *